United States Patent
Parker et al.

(10) Patent No.: US 12,467,326 B1
(45) Date of Patent: Nov. 11, 2025

(54) COMPACT MANAGED PRESSURE DRILLING SYSTEM ATTACHED TO ROTATING CONTROL DEVICE AND METHOD OF MAINTAINING PRESSURE CONTROL

(71) Applicant: PRUITT TOOL & SUPPLY CO., Fort Smith, AR (US)

(72) Inventors: Martyn Parker, Fort Smith, AR (US); Majid Moosavinia, Cornwall (GB); Benjamin Micah Spahn, Alma, AR (US)

(73) Assignee: PRUITT TOOL & SUPPLY CO., Fort Smith, AR (US)

(*) Notice: Subject to any disclaimer, the term of this patent is extended or adjusted under 35 U.S.C. 154(b) by 24 days.

(21) Appl. No.: 18/155,009

(22) Filed: Jan. 16, 2023

Related U.S. Application Data

(63) Continuation of application No. 17/215,658, filed on Mar. 29, 2021, now Pat. No. 11,555,362, which is a continuation of application No. 16/404,716, filed on May 6, 2019, now Pat. No. 10,961,795, which is a continuation-in-part of application No. 15/097,270, filed on Apr. 12, 2016, now abandoned.

(60) Provisional application No. 62/147,515, filed on Apr. 14, 2015, provisional application No. 62/146,361, filed on Apr. 12, 2015.

(51) Int. Cl.
*E21B 21/08* (2006.01)
*E21B 21/10* (2006.01)
*E21B 33/08* (2006.01)
*G05D 7/06* (2006.01)
*G05D 16/20* (2006.01)

(52) U.S. Cl.
CPC ............ *E21B 21/08* (2013.01); *E21B 21/106* (2013.01); *E21B 33/085* (2013.01); *G05D 7/0652* (2013.01); *G05D 16/204* (2013.01)

(58) Field of Classification Search
CPC ...... E21B 21/08; E21B 21/106; E21B 33/085; E21B 21/019
See application file for complete search history.

(56) References Cited

U.S. PATENT DOCUMENTS

| | | | |
|---|---|---|---|
| 6,286,593 B1* | 9/2001 | Holtby | E21B 33/03 137/15.08 |
| 8,727,037 B1* | 5/2014 | Mouton | E21B 44/00 175/48 |
| 2012/0090893 A1* | 4/2012 | Leuchtenberg | E21B 21/08 175/57 |

(Continued)

*Primary Examiner* — Tara Schimpf
*Assistant Examiner* — Lamia Quaim
(74) *Attorney, Agent, or Firm* — Schrantz Law Firm, PLLC; Stephen D. Schrantz

(57) ABSTRACT

The managed Pressure Drilling manifold provides accurate back pressure control of a well head when drilling. The MPD system provides two paths for the drilling fluid to flow from the RCD to the flowline. The drilling fluid flows along an MPD path sending the drilling fluids through at least one sensor, preferably three sensors, a flow control device, and a flowmeter. The MPD system also provides a bypass path that isolates the flow control device and flowmeter while direct the drilling fluid from the RCD to the bypass to avoid the flow control device and flowmeter. The MPD system provides three valves that direct the drilling fluid in the bypass path or the MPD path.

20 Claims, 2 Drawing Sheets

(56) References Cited

U.S. PATENT DOCUMENTS

2015/0152700 A1* 6/2015 Lovorn ................ E21B 21/106
    175/57
2016/0326817 A1* 11/2016 Orban ................... E21B 21/106

* cited by examiner

COMPACT MANAGED PRESSURE DRILLING SYSTEM ATTACHED TO ROTATING CONTROL DEVICE AND METHOD OF MAINTAINING PRESSURE CONTROL

CROSS-REFERENCE TO RELATED APPLICATIONS

This application claims priority to and is a continuation of U.S. patent application Ser. No. 17/215,658 filed on Mar. 29, 2021 entitled "COMPACT MANAGED PRESSURE DRILLING SYSTEM ATTACHED TO ROTATING CONTROL DEVICE AND METHOD OF MAINTAINING PRESSURE CONTROL" that is a continuation of U.S. patent application Ser. No. 16/404,716 filed on May 6, 2019 entitled "COMPACT MANAGED PRESSURE DRILLING SYSTEM ATTACHED TO ROTATING CONTROL DEVICE AND METHOD OF MAINTAINING PRESSURE CONTROL" that issued as U.S. Pat. No. 10,961,795 on Mar. 30, 2021 that is a continuation in part of U.S. patent application Ser. No. 15/097,270 filed on Apr. 12, 2016 entitled "COMPACT MANAGED PRESSURE DRILLING SYSTEM ATTACHED TO ROTATING CONTROL DEVICE AND METHOD OF MAINTAINING PRESSURE CONTROL" which is a continuation in part of U.S. Patent Application No. 62/147,515 filed on Apr. 14, 2015 entitled COMPACT MANAGED PRESSURE DRILLING SYSTEM ATTACHED TO ROTATING CONTROL DEVICE AND METHOD OF MAINTAINING AUTOMATED SET POINT PRESSURE CONTROL and U.S. Patent Application No. 62/146,361 filed on Apr. 12, 2015 entitled COMPACT MANAGED PRESSURE DRILLING MANIFOLD AND METHOD OF TUNING DRILLING PRESSURE CONTROL.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to managed pressure drilling (MPD) operations.

More specifically, the present invention is related to a compact MPD manifold and a method of tuning pressure control. The present invention is also related to a compact MPD system directly attached to the RCD. The present invention is also related to a method of maintaining automated set point pressure control with an automated MPD system.

SUMMARY OF THE INVENTION

The present invention incorporates a rotating control device having two or more major outlets incorporated into the RCD bowl/body. The primary major outlet is routed via a spool that incorporates three ports for Pressure Transducers, such as sensors. The three transducers measure the upstream choke pressure. The redundancy of three pressure transducers enables 2 out of 3 voting of data validation for upstream choke pressure. A full bore fail last position actuated isolation valve is located downstream from the spool. This validated pressure is used by a control system to accurately manipulate the choke/flow control device to accurately control the well bore (Annular) pressure. The choke line then is routed to inline flowmeter via manual isolation valve. The bypass located at rig flowline enables the system to bypass the MPD choke and meter system.

The second major outlet routed via isolation valve routes to the rigs normal drilling mud returns flowline. The present invention provides accurate pressure control of the well bore with no rig modification to incorporate the MPD choke system. The present invention allows the choke to be isolated for non MPD conventional operations.

The present invention is a new compact low cost Managed Pressure Drilling manifold that provides accurate back pressure control of a well head when drilling. The present invention provides a low cost MPD solution to meet the needs of customers drilling unconventional wells in which the safety benefits of being able to apply surface back pressure are desirable but the cost associated with having a full conventional MPD system is not economically viable.

The present invention provides a choke and may include a metering system. The metering system includes a Coriolis meter or other flowmeter with remote transmitter. The present invention is designed to be as compact and as mobile as possible to allow simple installation of sensitive equipment (PSU, controller & barriers). The control system (PSU, controller and barriers) mounted in an Exd mobile enclosure. In one embodiment, connectors could be implemented to allow quick and fast connection of power, skid instruments, remote workstation and 3rd party data exchange via communication link.

The pressure control system of the present invention utilizes an independent back up (Pressure responsible Controller) to compare sensed pressure and send a control signal to a control element that maintains the process pressure at or near the set point value.

It is an object of the present invention to provide a compact manifold design.

It is also an object of the present invention to provide a more responsive manifold with quicker reaction time.

It is also an object of the present invention to provide desired flow characteristics.

It is also an object of the present invention to reduce the costs of the MPD system.

It is also an object of the present invention to reduce the weight of the MPD system.

It is an object of the present invention to provide a compact design.

It is also an object of the present invention to increase the safety benefits.

It is also an object of the present invention to provide a low cost MPD solution.

It is also an object of the present invention to maintain the process pressure at or near the set point value.

It is also an object of the present invention to validate pressure.

It is also an object of the present invention to have precise pressure control without need for PID loop tuning.

It is also an object of the present invention to maintain automated set point pressure control.

It is also an object of the present invention to provide accurate pressure control.

It is also an object of the present invention to provide pressure control without modifying the rig to incorporate an MPD system.

It is also an object of the present invention to isolate the choke for non MPD conventional operations.

In addition to the features and advantages of the present invention, further advantages thereof will be apparent from the following description in conjunction with the appended drawings.

These and other objects of the invention will become more fully apparent as the description proceeds in the following specification and the attached drawings. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
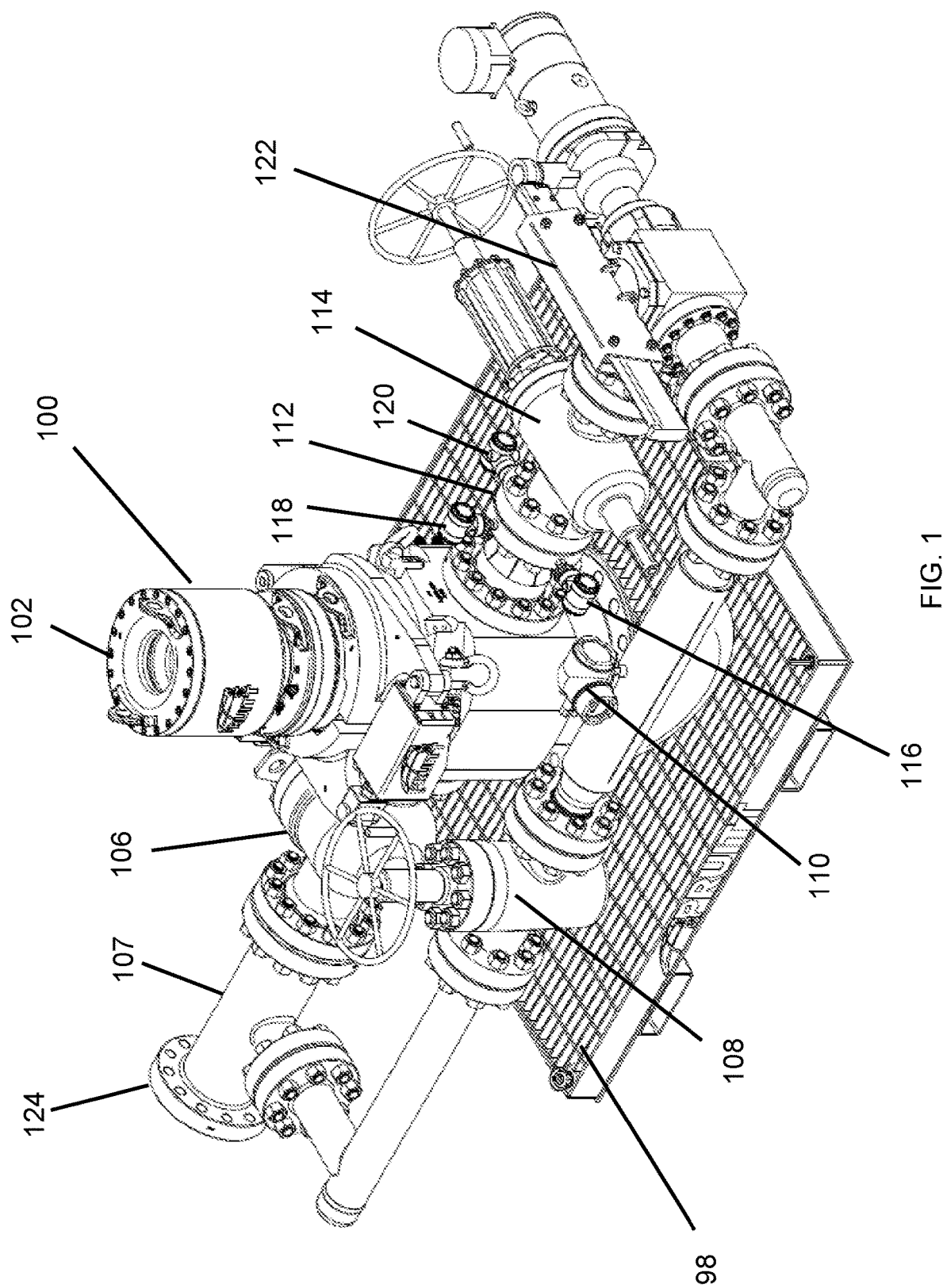
FIG. 1 is an environmental view of one embodiment of the present invention.

The present invention is designed to be as compact and as mobile as possible to allow simple installation of sensitive equipment (PSU, controller & barriers). The present invention provides a compact MPD solution that provides a low cost MPD solution to meet the needs of customers drilling unconventional wells in which the safety benefits of being able to apply surface back pressure are desirable but the cost associated with having a full conventional MPD system is not economically viable.

The present invention incorporates a rotating control device 102 ("RCD") having two major outlets 130, 132 incorporated into the RCD bowl/body. The primary major outlet 130 is routed via a spool 112 to the MPD path 128 that incorporates three ports for Pressure Transducers, such as sensors 116, 118, 120. The three transducers 116, 118, 120 measure the upstream choke pressure. The redundancy of three pressure transducers 116, 118, 120 enables 2 out of 3 voting of data validation for upstream choke pressure. A full bore fail last position actuated isolation valve 114 is located downstream from the spool 112. A control system uses this validated pressure to accurately manipulate the flow control device 122, such as the choke, to accurately control the well bore (Annular) pressure. The choke line then is routed to inline flowmeter 110 via manual isolation valve 108. Drilling fluid flowing through the flow control device 122 and the flowmeter 110 flows along the MPD path 128. The bypass 107 located at rig flowline 124 enables the system to bypass the MPD choke and meter system when flowing along the bypass path 126.

The second major outlet 132 routed via bypass valve 106 routes to the rigs normal drilling mud returns flowline 124. The present invention provides accurate pressure control of the well bore with no rig modification to incorporate the MPD choke system. The present invention allows the flow control device 122 to be isolated for non MPD conventional operations.

The present invention is a new compact low cost Managed Pressure Drilling system that provides accurate back pressure control of a well head when drilling. The present invention provides a low cost MPD solution to meet the needs of customers drilling unconventional wells in which the safety benefits of being able to apply surface back pressure are desirable but the cost associated with having a full conventional MPD system is not economically viable.

Figure 2:
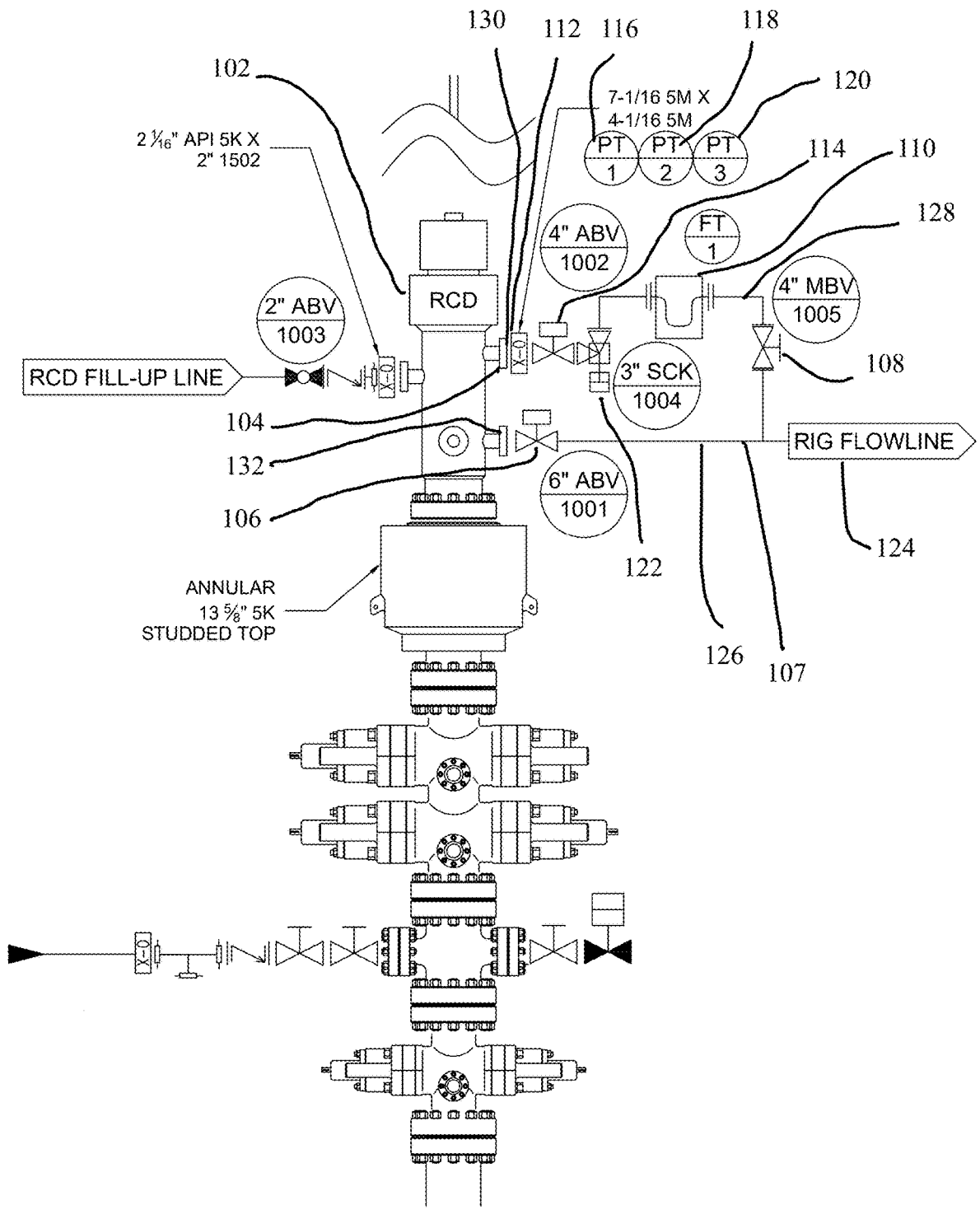
FIG. 2 is a schematic view thereof.

FIGS. 1-2 show a compact MPD system 100 directly attached to the flange 104 of an RCD 102. The flanged connection at RCD 102 flange 104 supports the compact MPD system 100. The size and reduced weight of the compact MPD system 100 enables the MPD system 100 to be physically located on the RCD 102.

In one embodiment, the MPD system 100 implements a flow control device 122, such as rotary disc style choke. The flow control device 122 of one embodiment operates via manipulator assembly and actuator, such as an electrical actuator. The flow control device 122 controls the fluid flow through the flow control device 122.

A drip tray 98 that also functions as a work platform for users also attaches to the RCD 102. The RCD 102 flange 104 fits the flow control device, the isolation valve, and the bypass/integrated relief valve. The reduced weight and size of the compact MPD system 100 is physically located on the RCD 102.

FIGS. 1 and 2 show the MPD system 100 that is secured to the RCD 102 and the flow of the drilling fluid from the RCD 102 to the rig flowline 124. The drilling fluid may flow through two different alternative paths to reach the flowline 124. The drilling fluid may flow through the MPD path 128 or through the bypass path 126. The drilling fluid may flow through the flow control device 122 and the flowmeter 110 to the flowline 124 by closing the bypass valve 106 and opening valves 108, 114. Closing bypass valve 106 and opening valves 108, 114 directs the drilling fluid through the MPD path 128 to the flowline 124. Alternatively, opening the bypass valve 106 and closing the valves 108, 114 directs the drilling fluid through the bypass path 126 and the bypass 107 to the flowline 124.

Closing bypass valve 106 directs the drilling fluid through the MPD path 128 through the flow control device 122 and the flowmeter 110. Opening valves 108, 114 while bypass valve 106 is closed provides the MPD path 128 for the drilling fluid to flow through the flow control device 122 and flowmeter 110 to the flowline 124. The drilling fluid flows past the pressure transducers 116, 118, 120. The pressure transducers 116, 118, 120 check upstream choke pressure. The multiple transducers 116, 118, 120 validate pressure to accurately manipulate the flow control device 122. The drilling fluid flows through the valve 114 and the flow control device 122 to the flowmeter 110. The drilling fluid then flows through the valve 108 to the flowline 124.

Closing valves 108, 114 and opening bypass valve 106 directs the drilling fluid through the bypass 107 to the flowline 124. Closing valves 108, 114 isolates the MPD system 100 and directs the drilling fluid through the bypass 107 along the bypass path 126.

FIG. 2 provides more information regarding the compact MPD system 100 and the flow of the drilling fluid. The MPD system 100 attaches at the flange 104 of RCD 102. Flow control device 122 controls the flow of the drilling fluid through the compact MPD system 100. Such flow control devices may include, but are not limited to chokes, valves, rotary Vee Balls, and Rotary Disc style Chokes.

FIG. 2 shows the MPD system 100 with pressure sensors 116, 118, 120. The increased number of pressure sensors 116, 118, 120 provides the MPD system 100 with additional information. Such additional sensors 116, 118, 120 enable automated control and alarms.

FIG. 2 shows the two different flow paths from the RCD 102 to the flowline. The drilling fluid flows through the MPD path 128 or through the bypass path 126. Valves 106, 108, 114 control the path through which the drilling fluid will flow.

The drilling fluid flows past the transducers 116, 118, 120 secured to the spool 112 attached to the flange 104. The transducers 116, 118, 120 directly attach to the flange 104 via spool 112. The drilling fluid when flowing through the MPD system 100 flows past the transducers 116, 118, 120 through the valve 114 past the flow control device 122 and flowmeter 110 through valve 108 to the flowline 124. Bypass valve 106 is closed while valves 108, 114 remain open to direct the drilling fluid through the flow control device 122 and the flow meter 110 along the MPD path 128.

The valves 106, 108, 114 also isolate the MPD system 100. Opening bypass valve 106 and closing valves 108, 114 isolates the MPD system 100 and directs the drilling fluid through bypass 107 to the flowline 124 along the bypass path 126.

1.1 Pressure Transmitter

In one embodiment, at least one Pressure Transmitter determines the upstream pressure on the choke manifold. Other embodiments may include multiple Pressure Transmitters. The Pressure Transmitter also provides for the primary process measurement for back pressure control. Note this Pressure Transmitter is located upstream of the isolation valve directly on the RCD.

1.2 Flow Transmitter

A Coriolis meter may be used for measuring mass flow and density. Meter diagnostics shall also be required in one embodiment for advance condition monitoring of the process such as gas breakout or presence etc. The unit shall include a remote transmitter head installed for extra protection during mobilization and normal operations. The flow transmitter is capable of determining the condition of the meter tubes and is capable of real time health of meter monitoring. The offset drive function will be used as an indicator to the presence of gas in the return flow.

1.3 Isolation Valves

The choke manifold of one embodiment is designed with two flow paths. Each flow path is protected by an actuated isolating valve.

1.4 Pressure Control

The flow control device 122 is installed on the well head main flow line. Well head pressure is controlled using modulating the flow control device in the flow line.

Effects of Gas in the Coriolis Meter:

The Coriolis meter used in the manifold of the present invention is not adversely affected by gas break out in the Coriolis tubes. The Coriolis meter recognizes the presence of gas by a change in the offset drive parameters. It is important to determine if the timing of changes in the offset drive parameters can be calculated to determine if they correspond to particular events such as Bottom up time from a drilling connection or a known positive drilling break.

1. Intelligent Sensors/Real Time Health Monitoring:

One of the key differences between the present invention and the known art is that the present invention continuously monitors its own health and the condition of its key equipment components. In doing so, the system of the present invention can alert the user to both ongoing problems such as equipment blockage/plugging events or general wear and tear/decrease in operability through usage.

EXAMPLES

Flow Control Valve wear: When the control valves are newly installed, the control system takes a signature of response of the valve to control several pressure set points at several given flow rates. This signature is then used as a reference point to the performance of the valves operating performance throughout its operational life. This means that the system can identify if a valve is requiring a greater degree of closure on a control valve than should be required and can then alert the MPD technician that the control valve is suffering from wear/erosion.

Increased Torque to operate valve: Again the system can alert the MPD technician of increased torque values to operate valves alerting the operator to inspect, clean and grease valves stems etc.

Coriolis Tube Monitoring: The condition of the pressure containing Coriolis meter tubes is a critical parameter to monitor This real time equipment health monitoring will may be utilized for preventative equipment maintenance.

In one embodiment, the system of the present invention may be predominantly operated by either the client or the drilling contractor. In another embodiment, the system of the present invention may be remotely supported, updated, and operated by personnel from a remote control center. In such a situation of remote operating, real time health monitoring capabilities of the system will be of vital importance in order for remote personnel to continue to deliver effective well controlled operations.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A managed pressure drilling (MPD) system for use on a rotating control device (RCD) having a first outlet and a second outlet at a well, wherein drilling fluid flows downstream from the RCD to a flowline, the MPD system comprising:

a first sensor detecting a pressure within a path configured to flow to the flowline;

a flow control device connected with the first outlet for flow of the drilling fluid to the flow control device, wherein the first sensor detects the pressure upstream of the flow control device; and a bypass path connected directly to the second outlet of the RCD, wherein the bypass path is configured to direct the drilling fluid to the flowline without passing through a choke.

2. The system of claim 1 further comprising:
a first valve located downstream of the first sensor.

3. The system of claim 2, wherein the first valve is located upstream of the flow control device, the first valve located between the flow control device and the first sensor.

4. The system of claim 2 further comprising:
a flow meter located downstream of the flow control device.

5. The system of claim 4 further comprising:
a second valve located downstream of the flowmeter, wherein the second valve is located upstream of the flowline, wherein the drilling fluid flows through the second valve to the flowline.

6. The system of claim 1 further comprising:
an MPD path directing the drilling fluid through the flow control device to the flowline, wherein the drilling fluid flows from the first outlet through the MPD path, wherein the first sensor detects the pressure in the MPD path upstream of the flow control device between the first outlet and the flow control device;
wherein the bypass path is sized the same as the MPD path.

7. The system of claim 1 further comprising:
a flow meter located downstream of the flow control device;
a second valve located downstream of the flowmeter, wherein the second valve is located upstream of the flowline, wherein the drilling fluid flows through the second valve to the flowline.

8. The system of claim 7 wherein closing the first valve and the second valve and opening the bypass valve directs the drilling fluid from the RCD through a bypass that avoids the flowmeter and the flow control device to the flowline.

9. The system of claim 8 wherein opening the first valve and the second valve and closing the bypass valve directs the drilling fluid from the RCD through the first sensor, the flow control device, and the flowmeter to the flowline.

10. The system of claim 1, wherein the bypass path is sized larger than the flow control device at full bore.

11. A managed pressure drilling (MPD) system for use on a rotating control device (RCD) having a first outlet and a second outlet at a well wherein the MPD system is located downstream of the first outlet of the RCD, wherein drilling fluid flows downstream from the RCD to a flowline, the MPD system comprising:
a flow control device connected with the first outlet, wherein the drilling fluid flows through the flow control device to the flowline;
a pressure transducer detecting pressure of the drilling fluid from the first outlet upstream of the flow control device; and
a bypass connected directly to the RCD, wherein the bypass is located upstream of the flow control device, wherein the bypass is configured to direct the drilling fluid from the RCD to the flowline without flowing through a choke.

12. The system of claim 11, wherein the bypass path is sized larger than the flow control device at full bore.

13. A managed pressure drilling (MPD) system for use on a rotating control device (RCD) having a first outlet and a second outlet at a well, wherein drilling fluid flows downstream from the RCD to the flowline, the system comprising:
a first pressure transducer detecting a pressure of the drilling fluid;
a flow control device connected with the first outlet, the flow control device located within an MPD path flowing from the first outlet, wherein the first pressure transducer detects the pressure within the MPD path;
a bypass path configured to direct the drilling fluid from the RCD to the flowline without flowing through a choke.

14. The system of claim 13 further comprising:
a first valve located downstream of the first pressure transducer, wherein the first valve is located upstream of the flow control device, the first valve located between the flow control device and the first pressure transducer.

15. The system of claim 14 further comprising:
a flow meter located downstream of the flow control device.

16. The system of claim 15 further comprising:
a second valve located downstream of the flowmeter, wherein the second valve is located upstream of the flowline, wherein the drilling fluid flows through the second valve to the flowline.

17. The system of claim 16 further comprising:
a bypass valve connected to the second outlet of the RCD wherein the bypass valve is located upstream of the flowline, wherein the drilling fluid flows through the bypass valve into the flowline.

18. The system of claim 17 wherein closing the first valve and the second valve and opening the bypass valve directs the drilling fluid from the RCD through the bypass path to the flowline avoiding the flow control device and the flowmeter.

19. The system of claim 17 wherein opening the first valve and the second valve and closing the bypass valve directs the drilling fluid from the RCD through the MPD path through the first pressure transducer, the flow control device, and the flowmeter to the flowline through the MPD path.

20. The system of claim 13, wherein the bypass path is connected to an outlet of the RCD and the bypass path is sized larger than the flow control device at full bore.

* * * * *